(12) United States Patent
Yamaguchi et al.

(10) Patent No.: US 7,624,301 B2
(45) Date of Patent: Nov. 24, 2009

(54) METHOD AND APPARATUS FOR IDENTIFYING FAILURE MODULE

(75) Inventors: Koji Yamaguchi, Kawasaki (JP); Hiroaki Sato, Kawasaki (JP); Mikio Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 11/191,934

(22) Filed: Jul. 29, 2005

(65) Prior Publication Data

US 2006/0218438 A1    Sep. 28, 2006

(30) Foreign Application Priority Data

Mar. 28, 2005   (JP)   ............... 2005-092380

(51) Int. Cl.
*G06F 11/00*   (2006.01)

(52) U.S. Cl. ............................. 714/9; 714/25

(58) Field of Classification Search ............ 714/9, 714/25
See application file for complete search history.

(56) References Cited

U.S. PATENT DOCUMENTS

| | | | |
|---|---|---|---|
| 5,202,887 A | | 4/1993 | Ueno et al. |
| 5,548,743 A | * | 8/1996 | Sugiyama et al. ........... 711/152 |
| 5,557,739 A | * | 9/1996 | Gupta et al. ................. 714/34 |
| 5,610,929 A | * | 3/1997 | Yamamoto .................. 714/785 |
| 5,615,335 A | * | 3/1997 | Onffroy et al. ............... 714/30 |
| 5,640,504 A | * | 6/1997 | Johnson, Jr. ................ 714/4 |
| 5,668,943 A | * | 9/1997 | Attanasio et al. ............ 714/7 |
| 5,761,428 A | * | 6/1998 | Sidey ........................ 709/223 |
| 5,774,645 A | * | 6/1998 | Beaujard et al. ............. 714/25 |
| 5,898,708 A | * | 4/1999 | Tateishi et al. .............. 714/752 |
| 6,147,967 A | * | 11/2000 | Ying et al. .................. 370/222 |
| 6,205,559 B1 | * | 3/2001 | Sakaguchi .................. 714/25 |
| 6,286,087 B1 | * | 9/2001 | Ito et al. ..................... 711/164 |
| 6,681,291 B2 | * | 1/2004 | Ikeuchi et al. .............. 711/114 |
| 6,760,820 B2 | * | 7/2004 | Henson et al. .............. 711/151 |
| 6,785,791 B2 | * | 8/2004 | Watanabe et al. ........... 711/165 |
| 7,243,266 B2 | * | 7/2007 | Hiramatsu et al. ........... 714/37 |
| 2002/0026612 A1 | * | 2/2002 | Osawa ....................... 714/726 |
| 2004/0088393 A1 | * | 5/2004 | Bullen et al. ................ 709/223 |
| 2006/0048023 A1 | * | 3/2006 | Hobara ...................... 714/718 |

(Continued)

FOREIGN PATENT DOCUMENTS

CN    1315732    10/2001

(Continued)

OTHER PUBLICATIONS

Korean Office Action mailed Oct. 21, 2006.

(Continued)

*Primary Examiner*—Scott T Baderman
*Assistant Examiner*—Kamini Patel
(74) *Attorney, Agent, or Firm*—Staas & Halsey LLP

(57) ABSTRACT

A failure-data register unit receives failure data from a failure detecting module. Based on the failure data, a test-execution instructing unit instructs each module to execute access tests for the module accessed when the failure detecting module detected the failure. When a test-result receiving unit receives results of the access tests, a failure-location identifying unit identifies the failed module based on the results. A server-request control unit suspends server I/O while the access tests are performed.

13 Claims, 9 Drawing Sheets

U.S. PATENT DOCUMENTS

2006/0200713 A1* 9/2006 Slobodnik et al. .......... 714/718

FOREIGN PATENT DOCUMENTS

| JP | 60-10328 | 1/1985 |
| JP | 2-81224 | 3/1990 |
| JP | 3-94321 | 4/1991 |
| JP | 3004861 | 9/1994 |
| JP | 9-198196 | 7/1997 |
| JP | 10-207787 | 8/1998 |
| JP | 10-321406 | 11/1998 |
| JP | 11-306644 | 11/1999 |
| JP | 2000-10736 | 1/2000 |
| JP | 2001-035172 | 2/2001 |
| JP | 2002-244934 | 8/2002 |
| JP | 2003-308180 | 10/2003 |
| JP | 2005-165680 | 6/2005 |
| JP | 2006-110721 | 4/2006 |
| KR | 95-012495 | 6/1995 |
| KR | 10-2001-0014760 | 2/2001 |
| KR | 2001-0014760 | 2/2001 |

OTHER PUBLICATIONS

Korean Patent Office Action, mailed Sep. 21, 2007 and issued in Korean Patent Application No. 10-2005-0068792.

Japanese Office Action issued on Apr. 7, 2009 in corresponding Japanese Patent Application 2005-092380.

* cited by examiner

FIG.4

| | CONTENTS | TYPE OF DATA PATTERN | TIME DURATION OF TEST |
|---|---|---|---|
| 1 | WRITE 520B × 8 | DATA PATTERN A | 0.5sec |
| 2 | ACCESS ASSURANCE | | |
| 3 | READ 520B × 8 | | |
| 4 | ACCESS ASSURANCE | | |
| 5 | COMPARE LEADING 4B | | |
| 6 | WRITE 520B × 8 | DATA PATTERN B | |
| 7 | ACCESS ASSURANCE | | |
| 8 | READ 520B × 8 | | |
| 9 | ACCESS ASSURANCE | | |
| 10 | COMPARE LEADING 4B | | |
| ~ | ~ | DATA PATTERN A | |
| ~ | ~ | DATA PATTERN B | |
| ⋮ | ⋮ | ⋮ | |
| ~ | ~ | DATA PATTERN B | |

FIG.5

| | PATTERN A | |
|---|---|---|
| 1 | 0x1230.1000, 0x1230.1004, 0x1230.1008..., 0x1230.11FC | ←—512B+BID |
| 2 | 0x1230.1200, 0x1230.1204, 0x1230.1208..., 0x1230.13FC | ←—512B+BID |
| 3 | 0x1230.1400, 0x1230.1404, 0x1230.1408..., 0x1230.15FC | ←—512B+BID |
| ⋮ | ⋮ | |
| 8 | 0x1230.1E00, 0x1230.1E04, 0x1230.1E08..., 0x1230.1EFC | ←—512B+BID |

| | PATTERN B | |
|---|---|---|
| 1 | 0 x EDCF.EFFF, 0xEDCF.EFFB, 0xEDCF.EFF7..., 0xEDCF.EE03 | ←—512B+BID |
| 2 | 0 x EDCF.EDFF, 0xEDCF.EDFB, 0xEDCF.EDF7..., 0xEDCF.EC03 | ←—512B+BID |
| 3 | 0 x EDCF.EBFF, 0xEDCF.EBFB, 0xEDCF.EBF7..., 0xEDCF.EA03 | ←—512B+BID |
| ⋮ | | |
| 8 | 0 x EDCF.E1FF, 0xEDCF.E1FB, 0xEDCF.E1F7..., 0xEDCF.E103 | ←—512B+BID |

METHOD AND APPARATUS FOR IDENTIFYING FAILURE MODULE

This application claims foreign priority to Japanese Patent Application 2005-92380, filed Mar. 28, 2005.

BACKGROUND OF THE INVENTION

1. Field of the Invention

The present invention relates to a technology for identifying a failure module in a disk controller including a plurality of modules.

2. Description of the Related Art

Conventionally, a storage system (for example, a storage device) including a plurality of disk devices, which can increase memory space and enhance input/output performance, has been suggested. When a failure occurs in a disk device, only the failed disk device needs to be replaced so that the storage device can continue operating.

To achieve a fault-tolerant storage device, components other than the disk device (that is, a module such as a controller) also need to be provided in redundancy. When a failure occurs in a module, only the failed module needs to be replaced so that the storage device can continue operating.

For example, Japanese Patent Application Laid-Open No. H11-306644 discloses a technology for detaching a failed disk device, and diagnosing the failure of the detached disk device. Moreover, Japanese Patent Application Laid-Open No. S60-10328 discloses a technology for determining, when a failure occurs, whether the failure occurred in the disk device itself or a channel device connected to the disk device.

The conventional technology can detect a failure by a module provided with a failure detecting mechanism. However, the conventional technology cannot identify the module where the failure occurred, because modules without the failure detecting mechanism exist on the same data path.

FIG. 11 is a conceptual diagram for explaining a conventional failure detecting method. It is assumed that the method is performed in a disk array device. A server writes/reads data in/from a disk device. The data is guaranteed to prevent data corruption.

The disk array device includes a channel adapter (CA) that controls a connection with a server, a device adapter (DA) controls a connection with a disk device, a controller module (CM) that controls the entire disk array device and typically includes a memory functioning as a disk cache, and a router (RT) that interconnects the CA, the DA, and the CM.

Each of the modules is provided in redundancy. Thus, when a failure occurs in a module, the disk array device can continue operating by replacing the failed module.

Data passing though the modules is checked to guarantee the data. For example, the CA and the DA perform a cyclic redundancy check (CRC) on the data. The CRC is performed by appending a CRC code of 16 bits to 32 bits to the data, and detecting a bit error in the data by using the CRC code. With the CRC, an error can be detected even when a plurality of bits changes. Thus, the CRC is often used for checking data in a disk controller.

On the other hand, the CM and the RT typically perform a parity check. The parity check can only detect a bit error of 1 bit, and cannot detect an error when a plurality of bits changes. The disk array device includes modules that only perform a parity check and modules that do not (cannot) check the data at all.

When a module performing the CRC (CA or DA) detects a data error, a module on the same data path (CM or RT) might include the error. However, because the CM and RT do not perform the CRC, the location of the error cannot be identified.

Thus, the conventional method cannot identify a module where a failure occurred, and therefore cannot determine which module is to be replaced. As a result, the disk array device cannot be recovered quickly and efficiently after a failure. Specifically, when a failure occurs, a maintenance staff has to refer to failure logs to identify the module where the failure occurred, and replace the failed module, which can lead to a system shutdown. However, accelerating progress of data processing systems calls for fault-tolerant systems in which a module with an error is identified and replaced quickly and efficiently to avoid a system shutdown.

SUMMARY OF THE INVENTION

An apparatus according to an aspect of the present invention, which identifies a failure module in a disk controller that includes a plurality of modules, includes: a test-instructing unit that instructs, when one of the modules detects a failure, the modules to execute an access test to a memory with test data; and an identifying unit that identifies a module where the failure occurred based on results of the access test.

A method according to another aspect of the present invention, which is a method of identifying a failure module in a disk controller that includes a plurality of modules, includes: instructing, when one of the modules detects a failure, the modules to execute an access test to a memory with test data; and identifying a module where the failure occurred based on results of the access test.

The above and other objects, features, advantages and technical and industrial significance of this invention will be better understood by reading the following detailed description of presently preferred embodiments of the invention, when considered in connection-with the accompanying drawings.

BRIEF DESCRIPTION OF THE DRAWINGS

FIG. 4 is a table of examples of an access test;

FIG. 5 is a table of examples of data patterns;

DETAILED DESCRIPTION OF THE PREFERRED EMBODIMENTS

Exemplary embodiments of the present invention will be described below with reference to accompanying drawings. It is assumed that a failure detecting device according to the present invention is provided in a controller that controls a storage device. The present invention is not limited to these embodiments.

Figure 1:
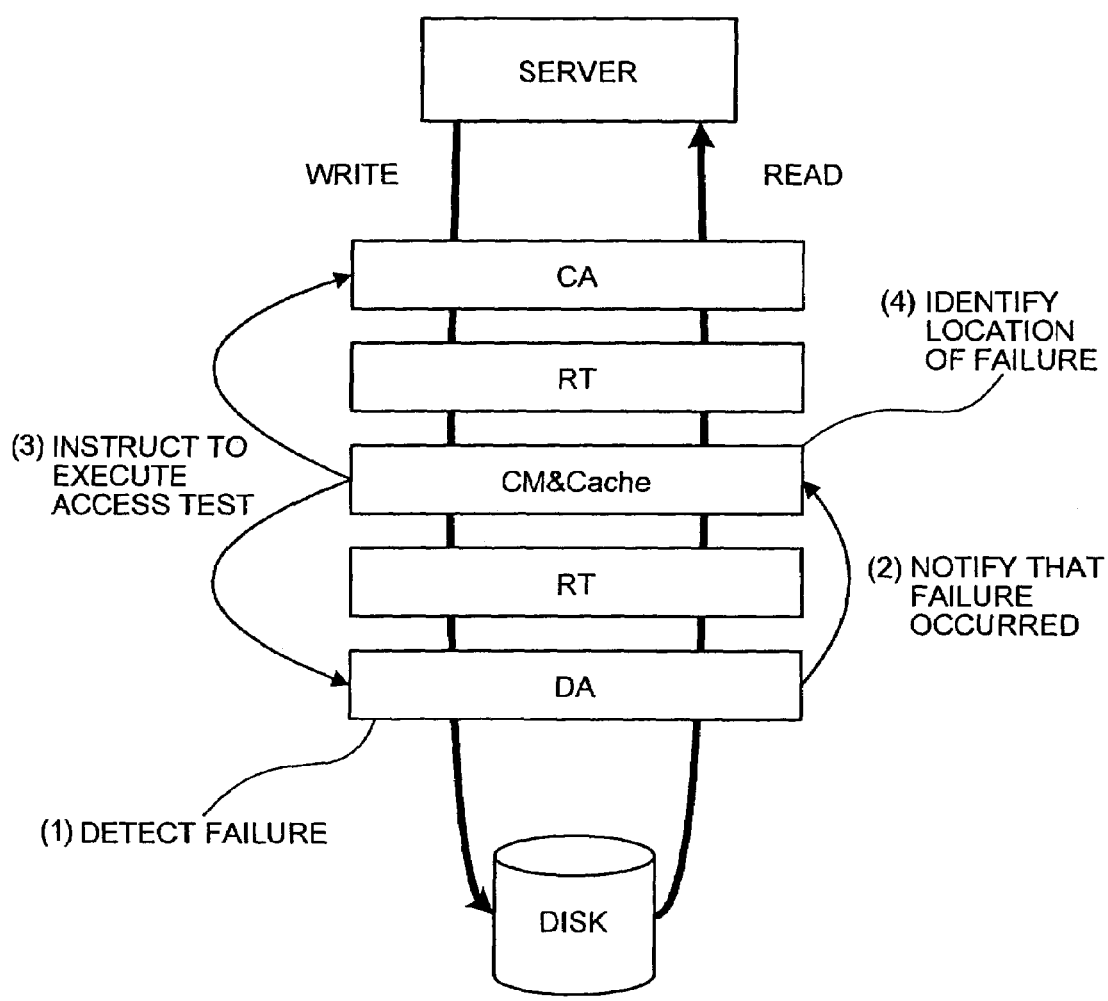
FIG. 1 is a conceptual diagram for explaining a failure detecting method according to an embodiment of the present invention.

FIG. 1 is a conceptual diagram for explaining a failure detecting method according to the present invention. When a first module performing the CRC (CA or DA) detects a failure (see "(1)" in FIG. 1), the first module notifies the failure to a second module including a failure detecting device (CM) (see "(2)" in FIG. 1). When receiving the notification, the second module instructs all modules capable of performing an "access test"(CA and DA) to execute the access test (see "(3)" in FIG. 1), and identifies a location (module) where the failure occurred based on results of the access test and the notification received from the first module (see "(4)" in FIG. 1).

As described above, the conventional failure detecting method cannot identify where a failure occurred, although it can detect that the failure occurred. Thus, a maintenance staff of the storage device has to refer to failure logs to identify the module where the failure occurred, and replace the failed module.

On the other hand, the salient feature of the present invention is that the failure detecting method can identify the module where the failure occurred. As described later, the failure detecting method can identify a location (module) where a failure occurred even when the failure occurred in a module that does not include a CRC function (CM or RT). Thus, a failure can be recovered quickly and efficiently.

Figure 2:
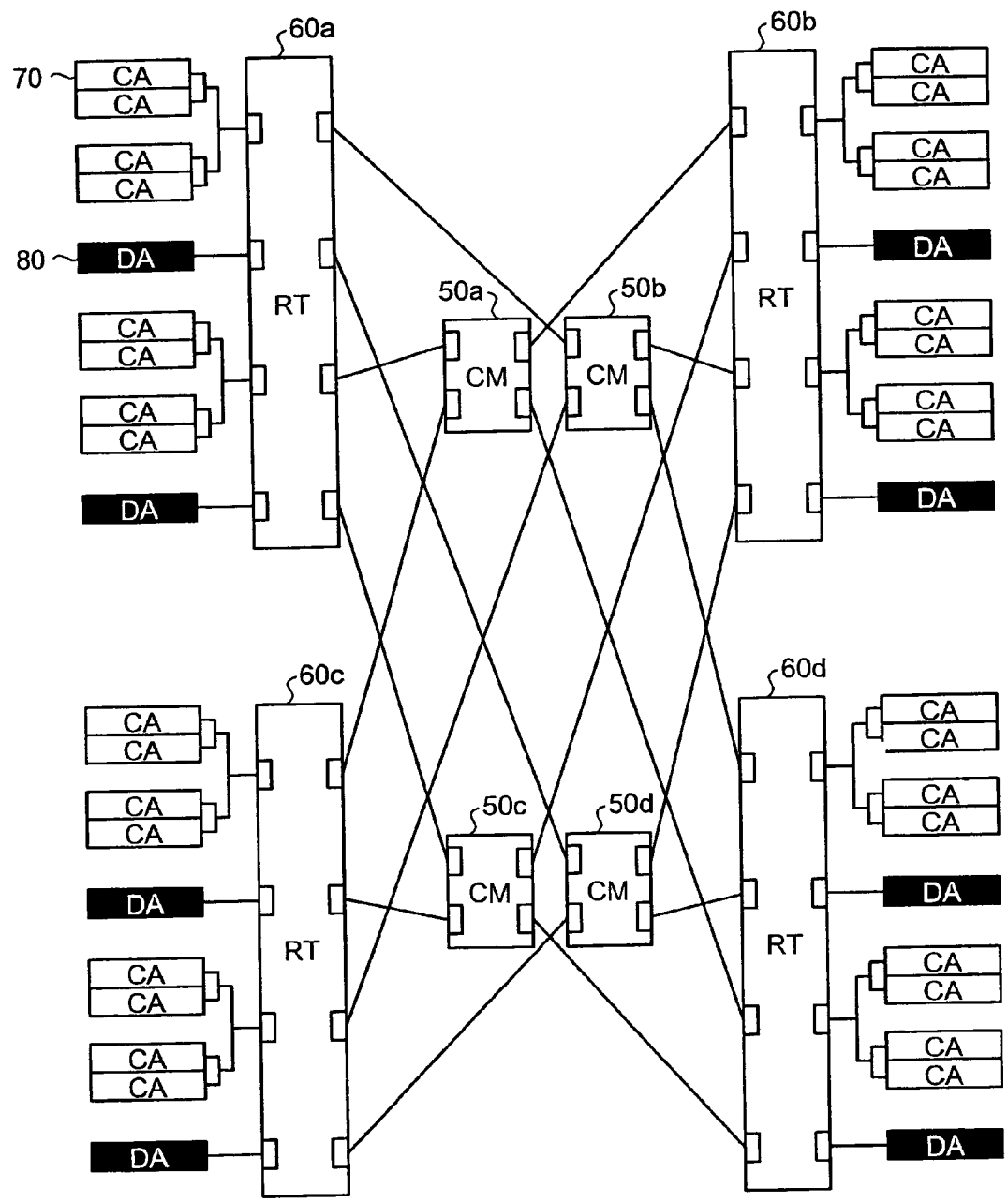
FIG. 2 is a diagram for illustrating a connection of modules shown in FIG. 1.

FIG. 2 is a diagram for illustrating a connection of the modules shown in FIG. 1. A plurality of each of the CM, RT, CA and DA are interconnected with each other. Therefore, when a failure occurs in a module, the storage device can continue operating by replacing the failed module.

For example, an RT 60a is connected to a plurality of CA 70 and DA 80. A CM 50a is connected to four RTs (60a to 60d). When a failure occurs in the CM 50a, another CM (50b to 50d) can function in place of the CM 50a.

One of the CMs (50a to 50d) functions as a master CM. The master CM is provided with the failure detecting device. Results of the access test are compiled at the master CM to identify a possibly failed module.

Figure 3:
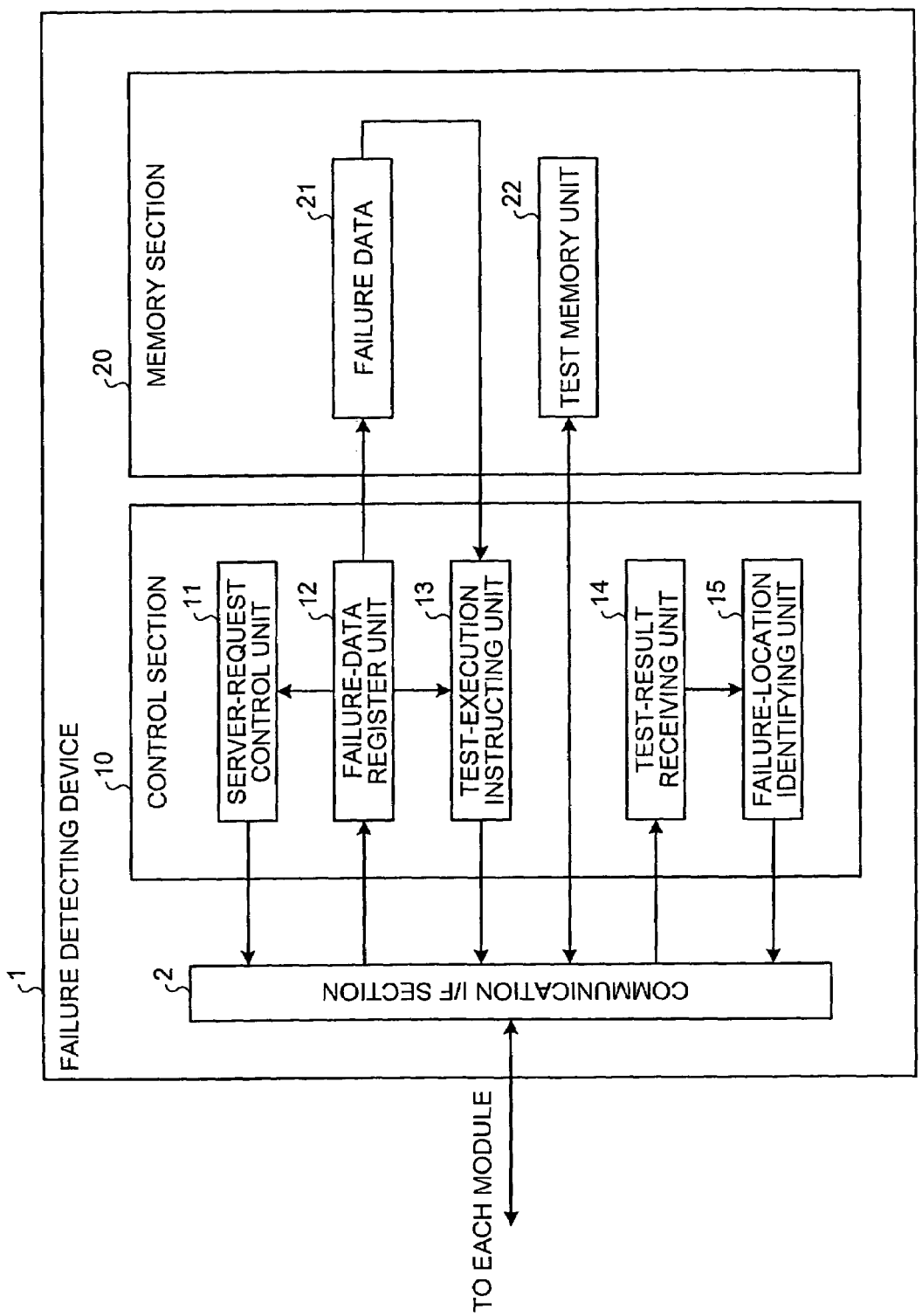
FIG. 3 is a functional block diagram of a failure detecting device according to the embodiment.

FIG. 3 is a functional block diagram of a failure detecting device 1. It is assumed that the failure detecting device is provided in the CM.

The failure detecting device 1 includes a communication interface (I/F) section 2, a control section 10, and a memory section 20. The control section 10 includes a server-request control unit 11, a failure-data register unit 12, a test-execution instructing unit 13, a test-result receiving unit 14, and a failure-location identifying unit 15. The memory section 20 includes a random access memory (RAM), failure data 21, and a test memory unit 22.

The communication I/F section 2 sends/receives data to/from the modules. The communication I/F section 2 passes data received from outside the failure detecting device 1 to the control section 10, and sends data received from the control section 10 outside the failure detecting device 1.

When the control section 10 receives failure data from the module that detected a failure (hereinafter, "failure detecting module"), the control section 10 instructs a plurality of modules to execute the access test by accessing the test memory unit 22, and identifies the failed module based on results of the access test.

The failure-data register unit 12 receives failure data from the failure detecting module through the communication I/F section 2, registers the data as the failure data 21 in the memory section 20, and notifies the server-request control unit 11 and the test-execution instructing unit 13 that the failure data is received.

Once the failure-data register unit 12 receives failure data, the failure-data register unit 12 does not accept any more failure data until a predetermined time duration passes, so that access tests based on the same failure are not executed several times. This prevents confusion in the processings.

The server-request control unit 11 controls the server to suspend and resume input or output of data to/from the disk (hereinafter, "server I/O"). For example, the server I/O is suspended while the access test is performed. This efficiently prevents regular data access processings from being affected by the access tests.

When the notification from the failure-data register unit 12 is received, the test-execution instructing unit 13 instructs a plurality of modules to execute the access test by accessing the test memory unit 22. Specifically, the test-execution instructing unit 13 acquires the failure data 21 indicating a CM accessed when the failure detecting module detected the failure. This CM is the object of access tests. The test-execution instructing unit 13 instructs a plurality of modules to execute access tests for the CM indicated by the failure data 21. When the test-execution instructing unit 13 instructs modules to execute access tests, the test-execution instructing unit 13 sends to each of the modules an identification number of the object CM, and an address in the test memory unit 22 where the access test is to be executed.

FIG. 4 is a table of examples of the access test. The test-execution instructing unit 13 instructs a plurality of modules to execute access tests shown in FIG. 4. Then, each module performs the processing of "Write 520 B×8" (see "1" in FIG. 4). Specifically, data of 520 bytes (hereinafter described as 520 B) is consecutively written 8 times in a predetermined area in the test memory unit 22. The data of 520 B is acquired by adding a block ID (BID) of 8 bytes to data of 512 B. Subsequently, the modules confirm whether the writing is successful (see "2" in FIG. 4).

The modules read the test data written (see "3" in FIG. 4), and confirm whether the reading is successful (see "4" in FIG. 4). The modules compare the leading 4 B of the data written and the data read (see "5" in FIG. 4).

These five processings constitute one set. For example, a first set uses data pattern A and a second set uses data pattern B, and the two data patterns are used alternately. These sets are repeated within 0.5 seconds. By repeating these processings for a predetermined time, a load is created. Therefore, the failure detecting device 1 can efficiently detect a failure that occurs only under a condition of high load.

FIG. 5 is a table of examples of the data pattern A and the data pattern B shown in FIG. 4. The data pattern A includes 8 rows of data that are used for the processings shown in FIG. 4. For example, the processing of "Write 520 B×8" at "1" in FIG. 4 uses the data at "1" to "8" in FIG. 5. "BID" indicated in FIG. 5 is assumed to be 8B. The data pattern B in FIG. 5 corresponds to exclusive OR (XOR) of the data pattern A.

A failure that occurs by reading/writing a particular data pattern is reproduced by alternately using different data patterns. Therefore, the failure detecting device 1 can precisely detect a failure. In FIG. 5, each row includes different data. However, the same data can be used consecutively (for example, 8 times).

The test data shown in FIGS. 4 and 5 are merely examples. Longer data can be used, or different patterns can be repeated.

Referring back to FIG. 3, the test-result receiving unit 14 receives results of the access tests executed by the modules, compiles the results, and passes the results to the failure-location identifying unit 15. The results include data indicating the type of the error detected, such as a CRC error, a BID error, a "Compare" error (see "5" in FIG. 4), etc.

The failure-location identifying unit 15 identifies the failed module based on data from the test-result receiving unit 14. FIGS. 6 to 9 are examples of procedures performed by the failure-location identifying unit 15.

Figure 6:
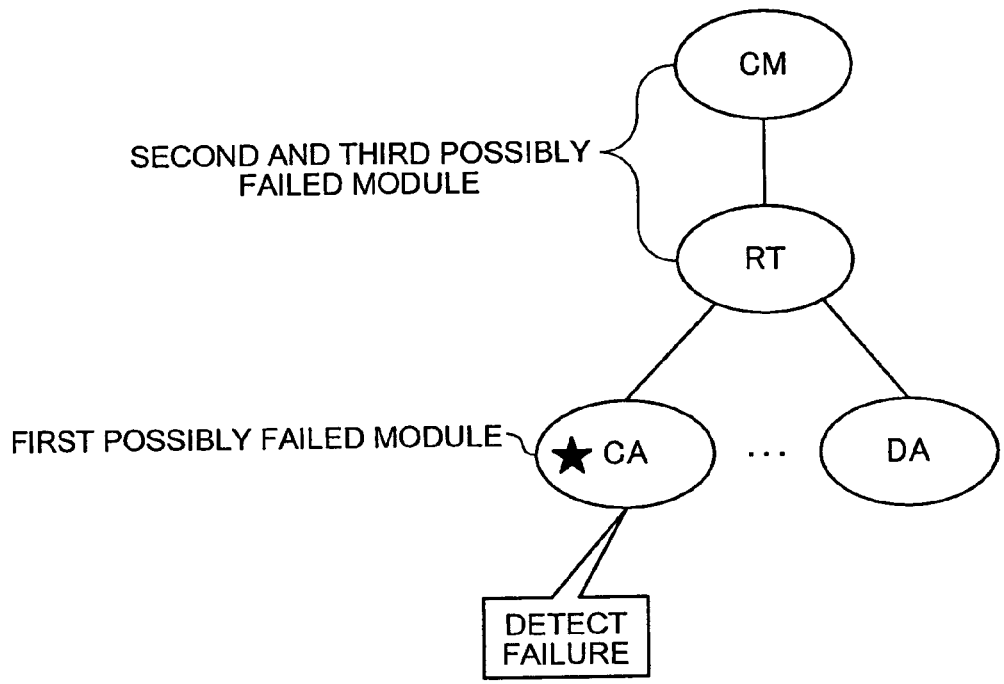
FIG. 6 is a first example of a procedure performed by a failure-location identifying unit.

In FIG. 6, a plurality of adapters (CA or DA) is connected to the RT. It is assumed that the CA detected a failure as a result of the access test. Therefore, the failure-location identifying unit 15 identifies the CA as the first possibly failed module, and the CM and the RT as the second and third possibly failed modules. The first possibly failed module is degenerated to be subject to active maintenance. When the failure does not recover after replacing the first possibly failed module, the second or third possibly failed modules are subject to active maintenance.

Figure 7:
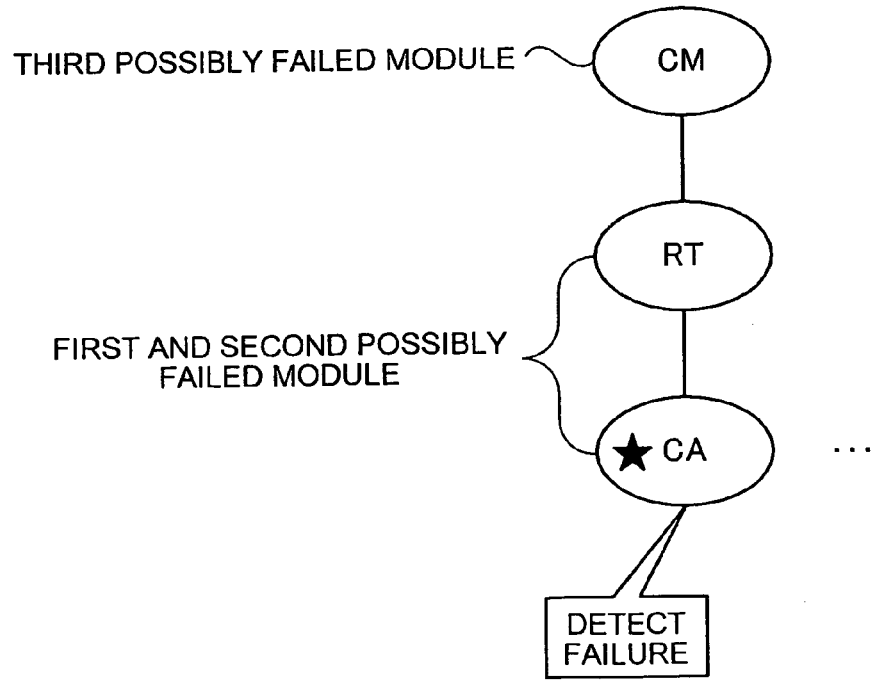
FIG. 7 is a second example of a procedure performed by the failure-location identifying unit.

In FIG. 7, only one adapter (CA) is connected to the RT. It is assumed that the CA detected a failure as a result of the access test. Therefore, the failure-location identifying unit 15 identifies the both the RT and the CA as the first and second possibly failed modules, and the CM as the third possibly failed module.

Figure 8:
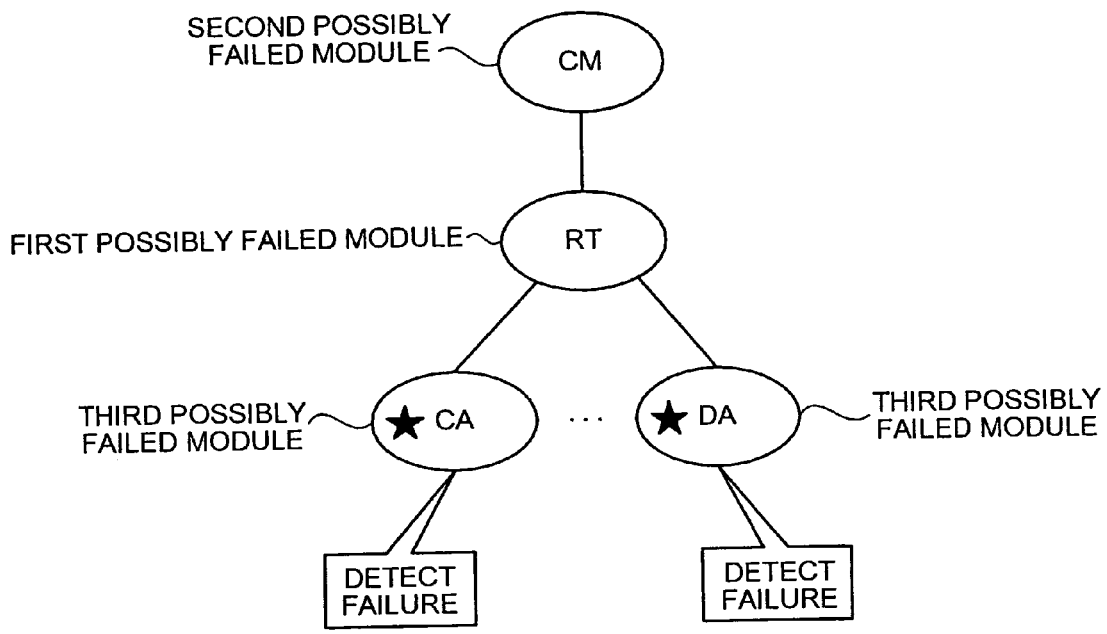
FIG. 8 is a third example of a procedure performed by the failure-location identifying unit.

In FIG. 8, a plurality of adapters (CA and DA) is connected to the RT. It is assumed that a plurality of adapters detected a failure as a result of the access test. Therefore, the failure-location identifying unit 15 identifies the RT as the first possibly failed module, the CM as the second possibly failed module, and the adapters that detected the failure (CA and DA) as third possibly failed modules.

Figure 9:
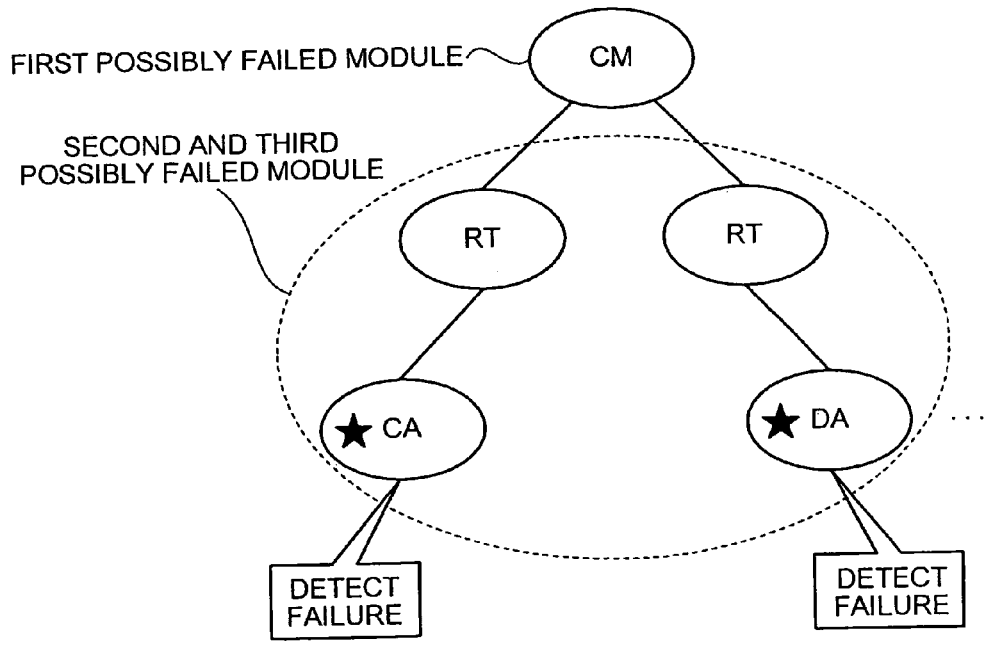
FIG. 9 is a fourth example of a procedure performed by the failure-location identifying unit.

In FIG. 9, a plurality of RTs is connected to the CM, and adaptors are connected to each of the RTs. It is assumed that a plurality of adapters each connected to different RTs detected a failure as a result of the access test. Therefore, the failure-location identifying unit 15 identifies the CM as the first possibly failed module, and the RTs and the adapters that detected the failure as the second and third possibly failed modules.

The failure-location identifying unit 15 receives results of the access test from the test-result receiving unit 14, identifies the failed module based on the results, and replaces the failed module. Thus, a failure can be recovered quickly and efficiently.

Referring back to FIG. 3, the failure data 21 registered in the memory section 20 indicates a CM accessed when the failure detecting module detected the failure. The test-execution instructing unit 13 instructs adapter modules (CA and DA) to execute access tests for the CM indicated by the failure data 21.

The test memory unit 22 is an area where the modules perform processings of writing/reading data. Specifically, the test memory unit 22 includes access areas allocated for each adapter module (CA or DA). Each adapter module executes access tests in the allocated access area. For example, an access area of at least 4,160 B is allocated for each adapter module to perform the processing of writing data of 520 B×8.

Figure 10:
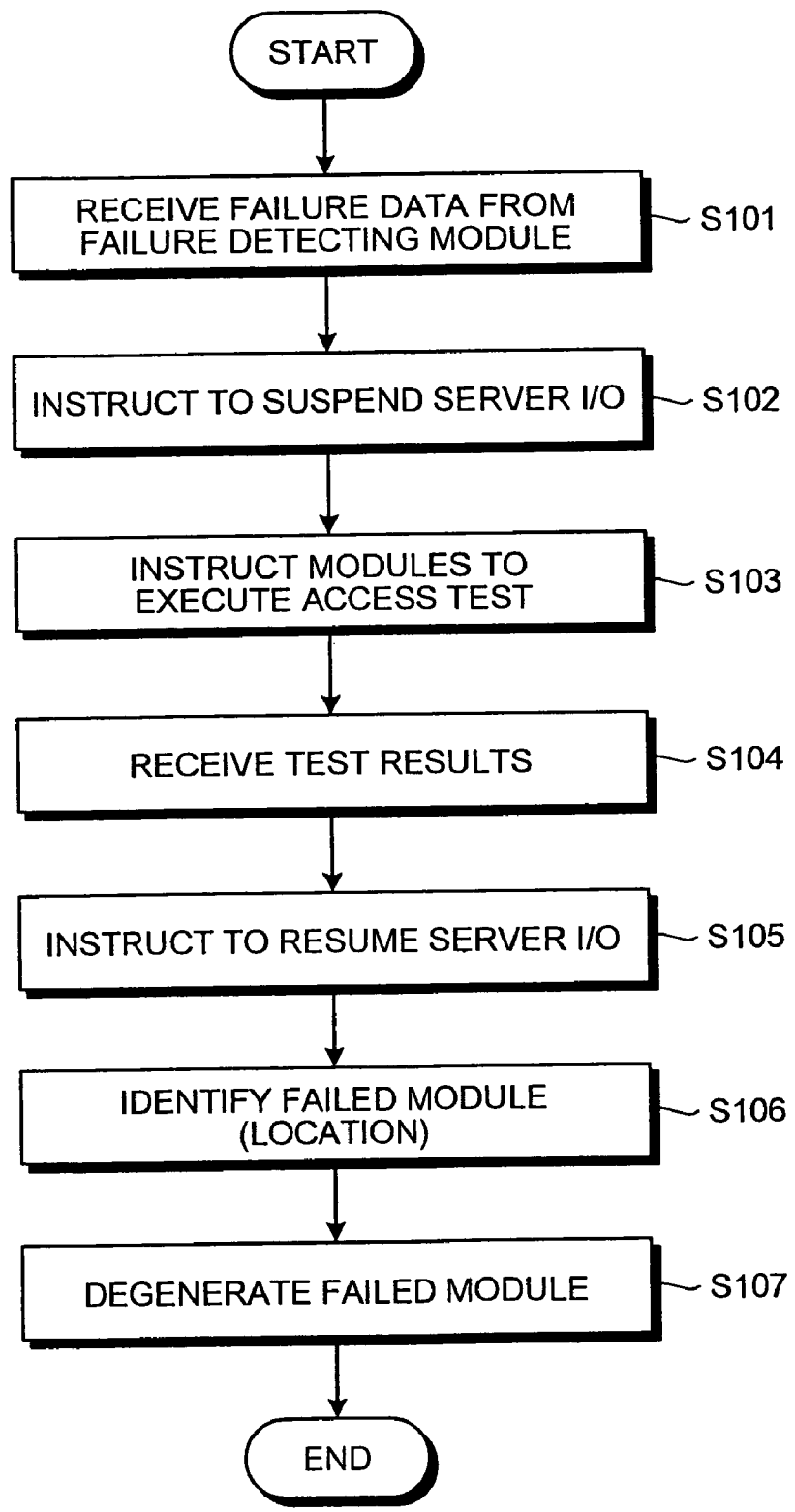
FIG. 10 is a flowchart of a failure detecting procedure performed by the failure detecting device.
Figure 11:
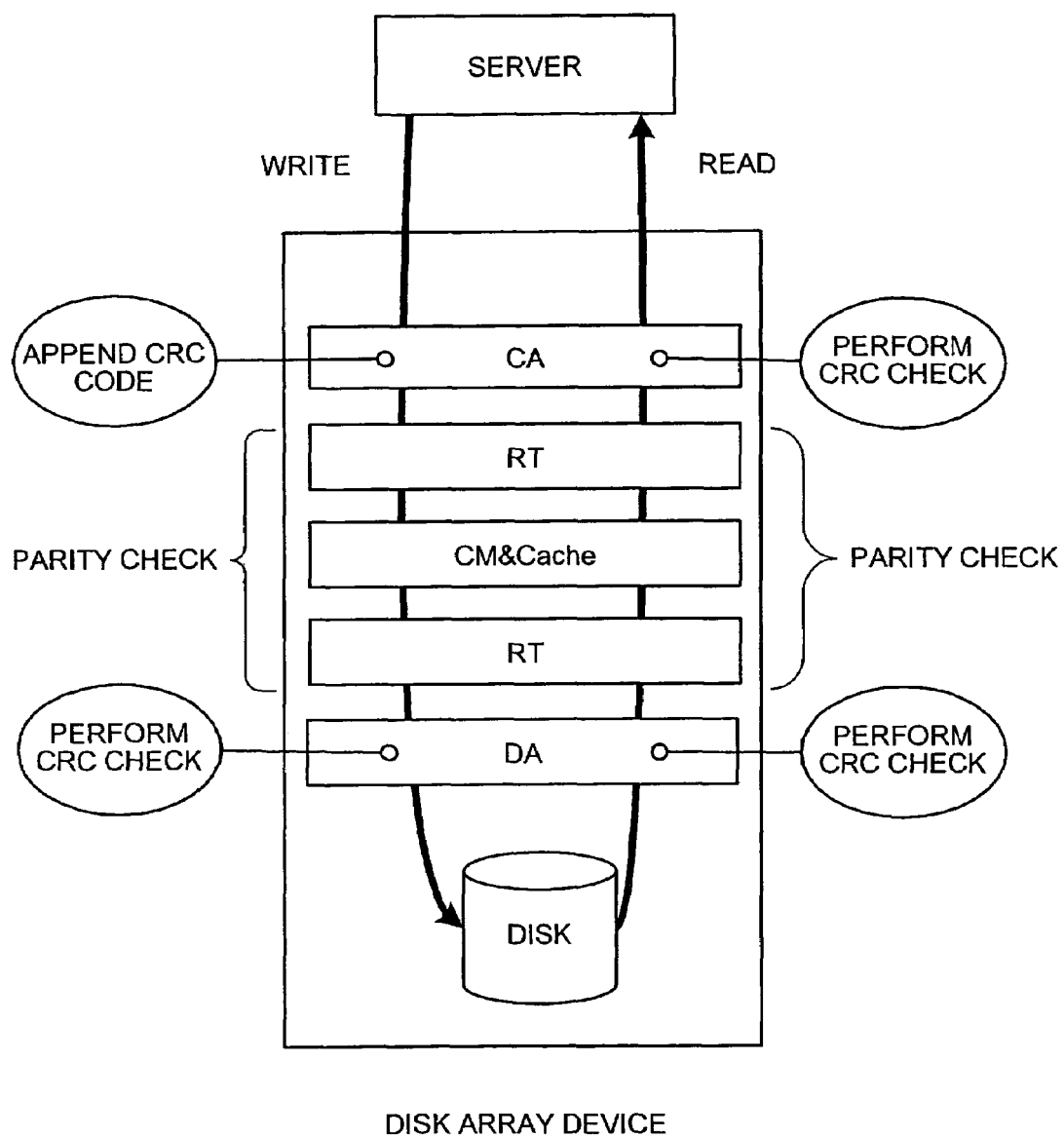
FIG. 11 is a conceptual diagram for explaining a conventional failure detecting method.

FIG. 10 is a flowchart of a failure detecting procedure performed by the failure detecting device 1. The failure-data register unit 12 receives failure data from a failure detecting module through the communication I/F section 2 (step S101). The failure-data register unit 12 instructs the server-request control unit 11 to suspend server I/O (step S102). For example, the server I/O is suspended for 1 second, until step S105.

The test-execution instructing unit 13 instructs a plurality of modules (CA and DA) to execute access tests for a CM accessed when the failure detecting module detected the failure, indicated by the failure data 21 (step S103). When the modules complete the access tests, the test-result receiving unit 14 receives results of the access tests (step S104), and instructs the server-request control unit 11 to resume server I/O (step S105).

The failure-location identifying unit 15 receives results of the access tests from the test-result receiving unit 14, and identifies a failed module by performing the procedures shown in FIGS. 6 to 9 (step S106). When the failed module is identified, the failed module is degenerated to be subject to active maintenance (step S107), and the processing ends.

According to the present embodiment, a failure-data register unit receives failure data from a failure detecting module. Based on the failure data, a test-execution instructing unit instructs each module to execute access tests for the module accessed when the failure detecting module detected the failure. When a test-result receiving unit receives results of the access tests, a failure-location identifying unit identifies the failed module based on the results. Therefore, even when a failure occurs in a module that is not provided with a failure detecting function, the failed module can be identified. Moreover, a server-request control unit suspends server I/O while the access tests are performed. Therefore, regular data access processings are efficiently prevented from being affected by the access tests.

Although the failure detecting device is provided in the CM according to the present embodiment, the present invention is not limited to this example. The failure detecting device can be provided in any other module, or outside the modules.

The failure detecting method according to the present embodiment can be implemented on a computer program by executing a computer program. The computer program can be stored in a computer-readable recording medium such as HD, FD, CD-ROM, DVD, and so forth, or can be downloaded via a network such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for identifying a failure module in a disk controller that includes a plurality of modules connected on data paths, the apparatus being implemented on a computer executing a computer program and comprising:

a test-instructing unit that instructs, when one of the modules detects a failure, the modules to execute an access test to a memory with test data; and an identifying unit that identifies a module as a possibly failed module based on results of the access test, wherein when more than one module is detected to have failed, the identifying unit identifies a common module that is commonly connected nearest to and upper than the more than one failed module on the data paths as the possibly failed module, when only one of the modules is detected to have failed and when a nearest upper module of the only one of the modules detected on the data paths has no other lower module than the only one of the modules detected on the data paths, the identifying unit identifies both of the nearest upper module and the only one of the modules as the possibly failed module, and when only one of the modules is detected to have failed and when a nearest upper module of the only one of the modules has other lower module than the only one of the modules on the data paths, the identifying unit identifies the only one of the modules as the most possibly failed module.

2. The apparatus according to claim 1, further comprising a suspending unit that suspends a disk access request from a server for a predetermined time.

3. The apparatus according to claim 1, wherein the test-instructing unit does not instruct the modules to execute another access test until a predetermined time passes after instructing the modules to execute the access test, even when another module detects anther failure.

4. A method for an apparatus to identify a failure module in a disk controller, the apparatus being implemented on a computer by executing a computer program, and the disk controller including a plurality of modules connected on data paths, the method comprising:
    instructing, when one of the modules detects a failure, the modules to execute an access test to a memory with test data; and
    identifying a module as a possibly failed module where the failure occurred based on results of the access test, wherein
    when more than one module is detected to be failed at the identifying, a common module that is commonly connected nearest to and upper than the more than one module on the data paths is identified as the possibly failed module,
    when only one of the modules is detected to have failed at the identifying, and when a nearest upper module of the only one of the modules on the data paths has no other lower module than the only one of the modules on the data paths, both of the nearest upper module and the only one of the modules are identified as the possibly failed module, and
    when only one of the modules is detected to have failed at the identifying, and when a nearest upper module of the only one of the modules has other lower module than the only one of the modules detected on the data paths, the only one of the modules is identified as the possibly failed module.

5. The method according to claim 4, further comprising suspending a disk access request from a server for a predetermined time.

6. The method according to claim 4, wherein the instructing includes does not instructing the modules to execute another access test until a predetermined time passes after instructing the modules to execute the access test, even when another module detects another failure.

7. A failure detecting device to identify a failed module among interconnecting modules controlling access to a data storage system, comprising:
    a memory storing test data;
    a control section that upon receiving information that a module failure has occurred, instructs each of the interconnecting modules to execute an access test, by performing at least one of reading and writing first data of the test data and second data of the test data alternatively, and identifies a module among the interconnecting modules that failed based on outcome of the access test; and
    a communication interface intermediating communication between the interconnecting modules and the control section or the memory, wherein
    the control section identifies a commonly connected module nearest to and upper than more than one failed module on the data paths, as a module possibly to have failed when multiple module failures are detected.

8. The apparatus according to claim 1, wherein the memory includes a test memory unit for the access test, and the access test is to write the test data in the test memory unit or to read the test data from the test memory unit or both repeatedly at a predetermined interval.

9. The apparatus according to claim 1, wherein
    the test data includes a first test data and a second test data, and
    the access test is to write the first test data and the second test data alternately in the memory or to read the first test data and the second test data alternately from the memory or both.

10. The method according to claim 4, wherein the memory includes a test memory unit for the access test, and the access test is to write the test data in the test memory unit or to read the test data from the test memory unit or both repeatedly at a predetermined interval.

11. The method according to claim 4, wherein
    the test data includes a first test data and a second test data, and
    the access test is to write the first test data and the second test data alternately in the memory or to read the first test data and the second test data alternately from the memory or both.

12. The apparatus according to claim 1, wherein the test-instructing unit instructs, based on a notification from the one of the modules, the modules accessible to an accessed module to access the accessed module to execute the access test, the accessed module being a module that was being accessed by the one of the modules at the time the one of the modules detected the failure.

13. The method according to claim 4, wherein the instructing includes instructing, based on a notification from the one of the modules, the modules accessible to an accessed module to access the accessed module to execute the access test, the accessed module being a module that was being accessed by the one of the modules at the time the one of the modules detected the failure.

* * * * *

UNITED STATES PATENT AND TRADEMARK OFFICE
CERTIFICATE OF CORRECTION

PATENT NO. : 7,624,301 B2  Page 1 of 1
APPLICATION NO. : 11/191934
DATED : November 24, 2009
INVENTOR(S) : Koji Yamaguchi et al.

It is certified that error appears in the above-identified patent and that said Letters Patent is hereby corrected as shown below:

Column 1, Line 5, change "2005-92380,filed" to --2005-92380, filed--.

Column 7, Line 12, change "anther" to --another--.

Signed and Sealed this

Ninth Day of February, 2010

David J. Kappos
*Director of the United States Patent and Trademark Office*